United States Patent
Vijayakumar et al.

(10) Patent No.: US 10,523,427 B2
(45) Date of Patent: Dec. 31, 2019

(54) SYSTEMS AND METHODS FOR MANAGEMENT CONTROLLER MANAGEMENT OF KEY ENCRYPTION KEY

(71) Applicant: Dell Products L.P., Round Rock, TX (US)

(72) Inventors: Gobind Vijayakumar, Trichy (IN); Johan Rahardjo, Austin, TX (US); Theodore Stratton Webb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 277 days.

(21) Appl. No.: 14/992,411

(22) Filed: Jan. 11, 2016

(65) Prior Publication Data

US 2017/0201373 A1    Jul. 13, 2017

(51) Int. Cl.
*H04L 9/08* (2006.01)
*G06F 11/07* (2006.01)
*G06F 11/14* (2006.01)

(52) U.S. Cl.
CPC ........ *H04L 9/0822* (2013.01); *G06F 11/0793* (2013.01); *G06F 11/1417* (2013.01); *G06F 11/1433* (2013.01); *G06F 11/1487* (2013.01)

(58) Field of Classification Search
CPC ... H04L 9/0822; H04L 9/0897; G06F 11/1433
USPC ...................................................... 713/189
See application file for complete search history.

(56) References Cited

U.S. PATENT DOCUMENTS

| | | | |
|---|---|---|---|
| 4,203,166 A * | 5/1980 | Ehrsam ................. | G06F 21/606 380/29 |
| 2006/0088167 A1* | 4/2006 | Bade ...................... | G06F 21/57 380/281 |
| 2006/0107032 A1* | 5/2006 | Paaske .................... | G06F 21/57 713/2 |
| 2007/0006282 A1* | 1/2007 | Durham ............. | H04L 63/0209 726/2 |
| 2007/0086588 A1* | 4/2007 | England ............. | G06F 21/6218 380/28 |
| 2011/0188656 A1* | 8/2011 | McCullough ............ | H04L 9/14 380/259 |

* cited by examiner

*Primary Examiner* — Eleni A Shiferaw
*Assistant Examiner* — Angela R Holmes
(74) *Attorney, Agent, or Firm* — Jackson Walker L.L.P.

(57) ABSTRACT

In accordance with embodiments of the present disclosure, a management controller configured to provide management-domain management of an information handling system may include a processor and a key management utility embodied in non-transitory computer-readable media. The key management utility may be configured to issue one or more commands to a cryptoprocessor for storing and sealing a key encryption key on the cryptoprocessor, wherein the key encryption key is for decrypting a media encryption key for encrypting and decrypting data stored to a storage resource of a host domain of the information handling system. The key management utility may also be configured to issue one or more commands to the cryptoprocessor for unsealing and retrieving the key encryption key from the cryptoprocessor.

16 Claims, 2 Drawing Sheets

SYSTEMS AND METHODS FOR MANAGEMENT CONTROLLER MANAGEMENT OF KEY ENCRYPTION KEY

TECHNICAL FIELD

The present disclosure relates in general to information handling systems, and more particularly to methods and systems for revoking and replacing signing keys used to authenticate firmware of information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As is known in the art, data associated with an information handling system may be stored on a storage resource, such as, for example, one or more hard disk drives. A type of storage resource becoming more prevalent is a self-encrypting storage resource, sometimes known as a self-encrypting drive. In a self-encrypting storage resource, data stored to the storage resource is encrypted with a media encryption key (MEK) which may also be used to decrypt such data. The MEK itself may also be encrypted with a key encryption key (KEK), which must be provided at powering up of the self-encrypting storage resource in order to unlock the MEK for use. Thus, the MEK is stored in the storage resource, while the KEK can be stored within the information handling system (known as local key management) or externally to the information handling system.

In traditional approaches, a KEK may be stored with a storage controller interfaced with the self-encrypting storage resource. However, this may render the KEK vulnerable for numerous reasons. First, the KEK is not protected by any authentication, which may leave a compromised information handling system susceptible to a malicious attack that gains access to the KEK. Second, a user/administrator of the information handling system may "turn rogue" and compromise the data, either by misappropriating the self-encrypting storage resource's data and the KEK. In addition, current approaches may leave data susceptible to permanent loss in the event of a failure of a storage controller upon which the KEK is stored/maintained.

SUMMARY

In accordance with the teachings of the present disclosure, the disadvantages and problems associated with existing approaches to management of a key encryption key for use in connection with a self-encrypting storage resource may be reduced or eliminated.

In accordance with embodiments of the present disclosure, a management controller configured to provide management-domain management of an information handling system may include a processor and a key management utility embodied in non-transitory computer-readable media. The key management utility may be configured to issue one or more commands to a cryptoprocessor for storing and sealing a key encryption key on the cryptoprocessor, wherein the key encryption key is for decrypting a media encryption key for encrypting and decrypting data stored to a storage resource of a host domain of the information handling system. The key management utility may also be configured to issue one or more commands to the cryptoprocessor for unsealing and retrieving the key encryption key from the cryptoprocessor.

In accordance with these and other embodiments of the present disclosure, a method may include issuing from a management controller configured to provide management-domain management of an information handling system one or more commands to a cryptoprocessor for storing and sealing a key encryption key on the cryptoprocessor, wherein the key encryption key is for decrypting a media encryption key for encrypting and decrypting data stored to a storage resource of a host domain of the information handling system. The method may also include issuing one or more commands to the cryptoprocessor for unsealing and retrieving the key encryption key from the cryptoprocessor.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
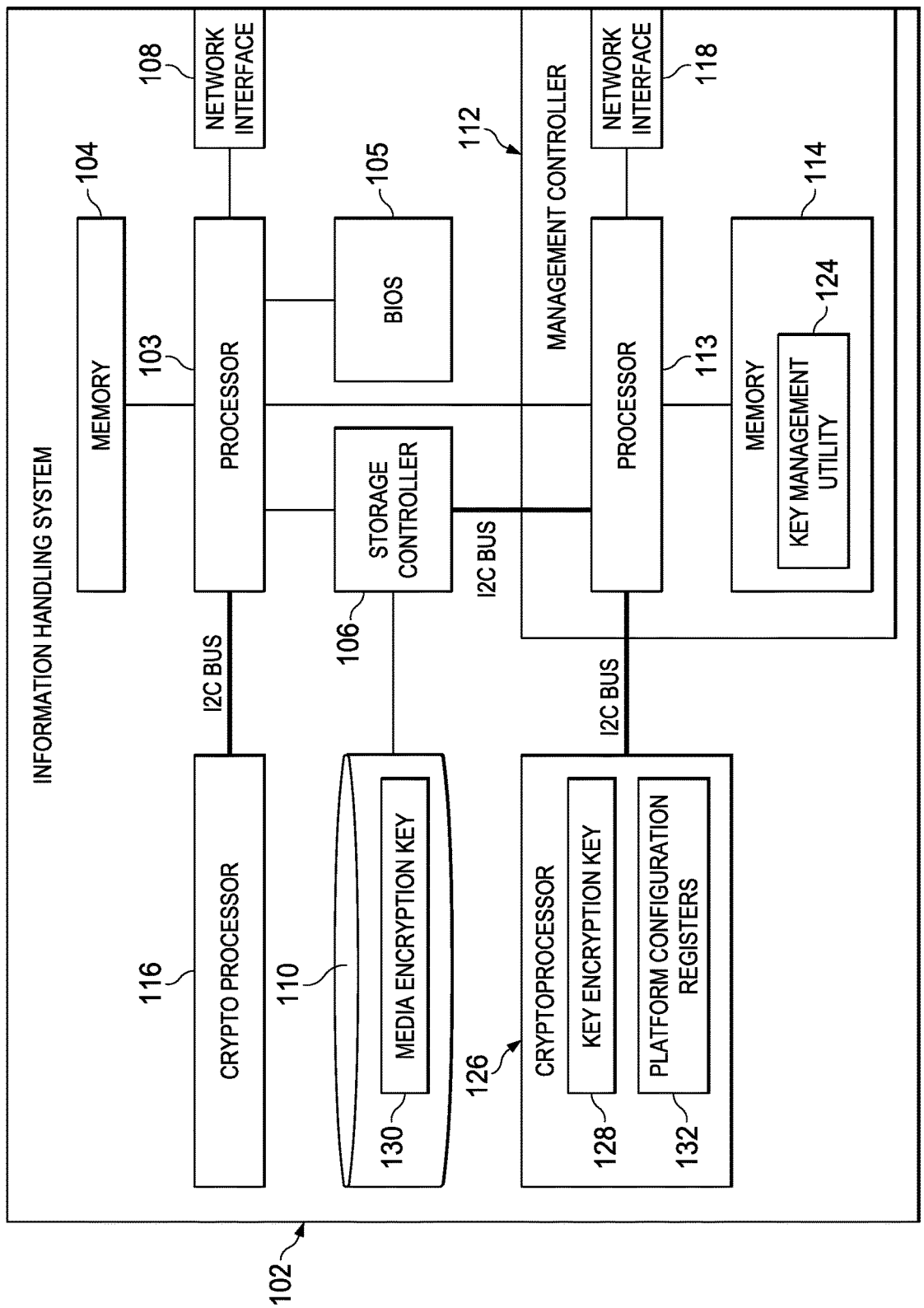
FIG. 1 illustrates a block diagram of an example information handling system, in accordance with embodiments of the present disclosure.
Figure 2:
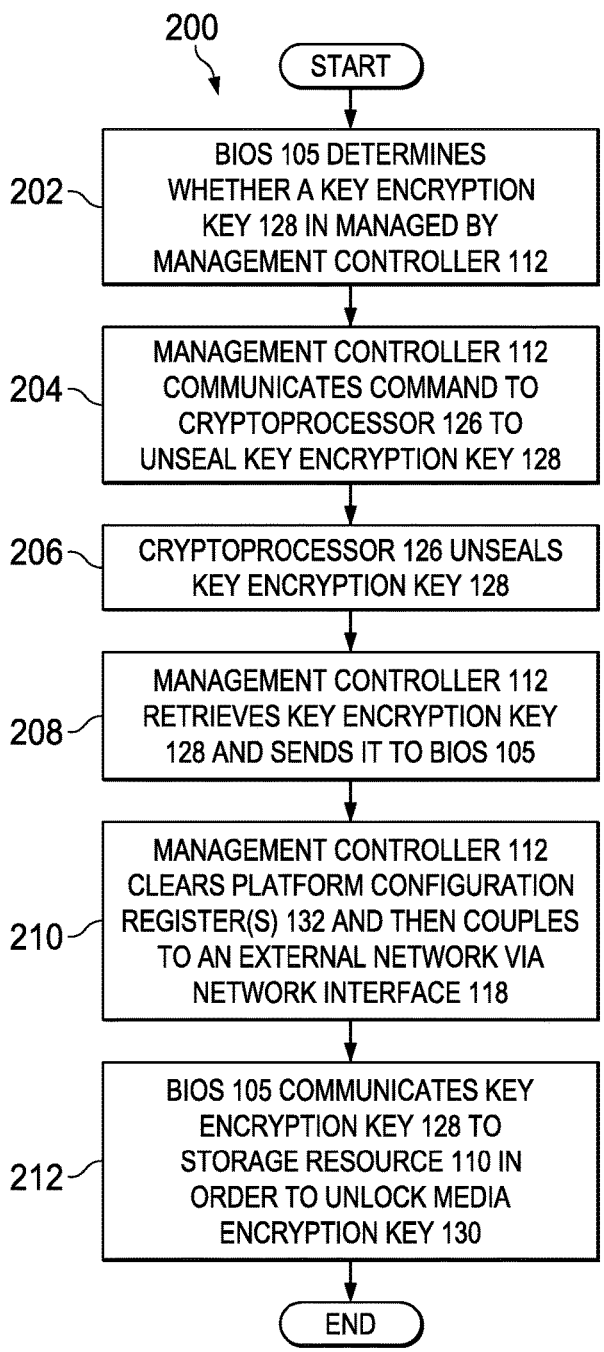
FIG. 2 illustrates a flow chart of an example method for retrieving a key encryption key from a cryptoprocessor dedicated to a management controller, in accordance with embodiments of the present disclosure.
Figure 3:
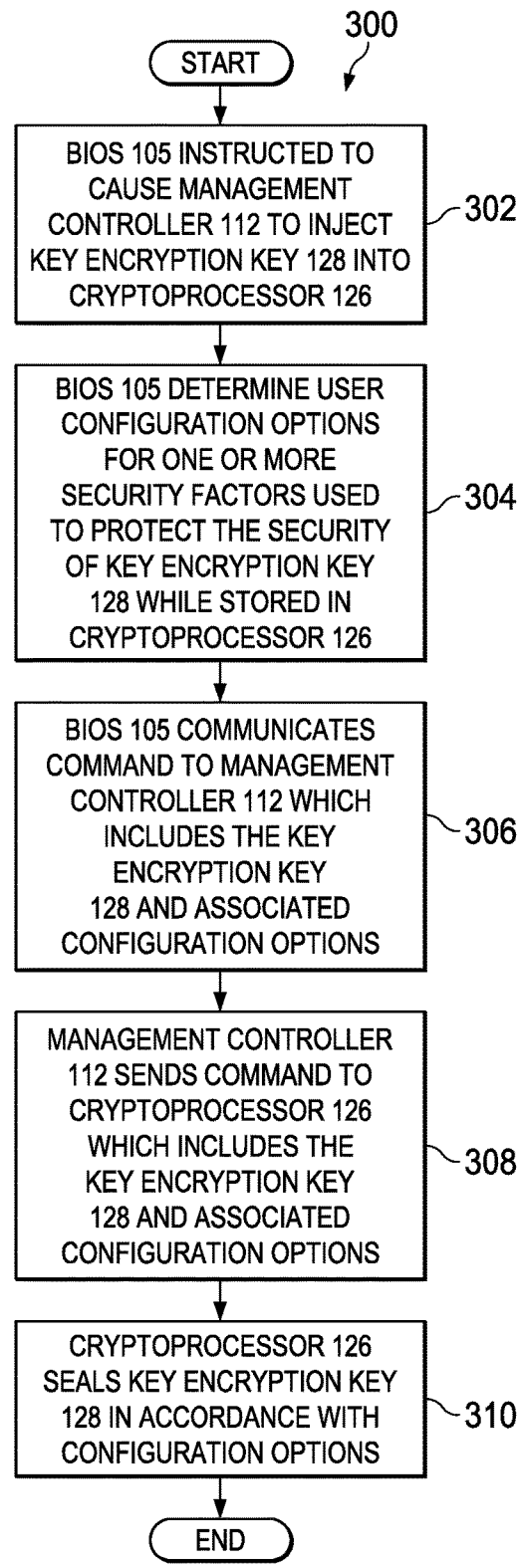
FIG. 3 illustrates a flow chart of an example method for provisioning a key encryption key on a cryptoprocessor dedicated to a management controller, in accordance with embodiments of the present disclosure.

Preferred embodiments and their advantages are best understood by reference to FIGS. 1 through 3, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an information handling system 102. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output (BIOS) system 105 communicatively coupled to processor 103, a storage controller 106 communicatively coupled to processor 103, a network interface 108 communicatively coupled to processor 103, a storage resource 110 communicatively coupled to storage controller 106, a management controller 112 communicatively coupled to processor 103 and storage controller 106, a cryptoprocessor 116 communicatively coupled to processor 103, and a cryptoprocessor 126 communicatively coupled to processor 113 of management controller 112.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Storage controller 106 may include any system, apparatus, or device operable to manage the communication of data between processor 103 and storage resource 110. In certain embodiments, storage controller 106 may provide functionality including, without limitation, disk aggregation and redundancy (e.g., RAID), I/O routing, and error detection and recovery. Storage controller 106 may also have features supporting shared storage and high availability. In some embodiments, storage controller 106 may comprise a PowerEdge RAID Controller (PERC) manufactured by Dell Inc.

Network interface 108 may comprise any suitable system, apparatus, or device operable to serve as an interface between information handling system 102 and one or more other information handling systems. Network interface 108 may enable information handling system 102 to communicate using any suitable transmission protocol and/or standard. In these and other embodiments, network interface 108 may comprise a network interface card, or "NIC."

A storage resource 110 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resource 110 may comprise a plurality of physical storage resources that may appear to an operating system or virtual machine executing on information handling system 102 as a single logical storage unit or virtual storage resource. For example, each such virtual storage resource may comprise a RAID. Thus, in some embodiments, a virtual storage resource may comprise a redundant array of physical storage resources. In the same or alternative embodiments, a virtual storage resource may be implemented using a RAID standard. Although FIG. 1 depicts storage resource 110 internal to information handling system 102, in some embodiments, storage resource 110 may be external to information handling system 102 (e.g., embodied by a physical array of external hard disk drives).

As shown in FIG. 1, in addition to data stored on storage resource 110, storage resource 110 may have a media encryption key (MEK) 130. In operation of storage resource 110, data written to storage resource 110 may be encrypted with MEK 130 prior to storage on storage resource 110 and data read from storage resource 110 may be decrypted with MEK 130. In such embodiments, storage resource 110 may include all necessary logic and functionality to perform such encryption and decryption, and thus storage resource 110 may comprise a self-encrypting storage resource or self-encrypting disk.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be coupled to storage controller 110 via an Inter-Integrated Circuit (I2C) bus.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

As shown in FIG. 1, memory 114 may have stored thereon a key management utility 124. Key management utility 124 may include any system, device, or apparatus configured to receive an instruction to manage sealing, storing, and/or other functions with respect to a key encryption key (KEK) that may be used to securely encrypt MEK 130 of storage resource 110. Example functionality of key management utility 124 is set forth in greater detail below. In some embodiments, key management utility 124 may be implemented as a program of instructions that may be read by and executed on processor 113 to carry out the functionality of key management utility 124.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

Cryptoprocessor 116 may be communicatively coupled to processor 103 and/or BIOS 105 and may include any system, device, or apparatus configured to carry out cryptographic operations on data communicated to it from processor 103, BIOS 105, and/or another component of information handling system 102. In some embodiments, cryptoprocessor 116 may be compliant with the Trusted Platform Module specification, a successor specification, and/or any other similar specification. In some embodiments, cryptoprocessor 116 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys and/or store keys (e.g., endorsement key, storage root key, attestation identity keys, storage keys).

Cryptoprocessor 126 may be communicatively coupled to processor 113 (e.g., via an I2C bus) and may include any system, device, or apparatus configured to carry out cryptographic operations on data communicated to it from processor 113 and/or another component of management controller 112. Thus, unlike general purpose cryptoprocessor 116, cryptoprocessor 126 may be dedicated to management controller 112. In some embodiments, cryptoprocessor 126 may be compliant with the Trusted Platform Module specification, a successor specification, and/or any other similar specification. In some embodiments, cryptoprocessor 126 may be configured to generate random numbers, generate encryption keys (e.g., RSA keys), generate and maintain hash key tables of hardware and software components associated with management controller 112, generate and maintain configuration parameters associated with hardware and software components of management controller 112, wrap (e.g., encrypt) keys, unwrap (e.g., decrypt) keys and/or store keys (e.g., endorsement key, storage root key, attestation identity keys, storage keys).

In some embodiments, cryptoprocessor 126 may comprise a non-volatile memory accessible only to cryptoprocessor 126. As shown in FIG. 1, such non-volatile memory may store key encryption key (KEK) 128 and one or more platform configuration registers (PCRs) 132. KEK 128 may comprise a cryptographic key which may be used to, among other things, decrypt MEK 130 upon initialization of storage resource 110 such that MEK 130 may be unlocked for use to encrypt data written to storage resource 110 and/or decrypt data read from storage resource 110.

PCRs 132 may comprise memory registers used to store data. For example, PCRs 132 may be used to, among other things, perform a Static Root of Trust Measurement (SRTM) chain for boot of management controller 112. Using SRTM, during each phase of boot of management controller 112, a secure hash of the next component of a boot process for management controller 112 may be performed with such hash stored in PCRs 132. This process may be referred to as "measurement," as cryptoprocessor 126 may use the data in PCRs 132 to determine whether some access of the boot code for management controller 112 has changed from a boot in which the code was originally measured using similar approaches.

In some embodiments, KEK 128 may be encrypted or "sealed" by cryptoprocessor 126 using the values expected in PCRs 132. Thus, if boot code of management controller 112 is changed, then PCR 132 values will change from their originally-measured values, and cryptoprocessor 126 would be unable to unseal KEK 128.

In addition to processor 103, memory 104, BIOS 105, a storage controller 106, network interface 108, storage resource 110, management controller 112, cryptoprocessor 116, and cryptoprocessor 126, information handling system 102 may include one or more other information handling resources.

FIG. 2 illustrates a flow chart of an example method for retrieving a KEK from cryptoprocessor 126, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, during initialization of information handling system 102 (e.g., during boot), BIOS 105 executing on processor 103 may determine (e.g., by communicating a command or other message to management controller 112) whether a KEK is managed by management controller 112. In response, at step 204, key management utility 124 of management controller 112 may communicate a command to cryptoprocessor 126 to unseal KEK 128. At 206, cryptoprocessor 126 may unseal KEK 128 with one or more values present in PCRs 132. In addition or alternatively, in some embodiments, cryptoprocessor 126 may unseal KEK 128 only if one or more conditions other than correct values of PCRs 132 are present, such as, for example, entry of a correct password or other shared secret by a user of information handling system 102 during boot.

In the event of a failure in unsealing KEK 128 (e.g., code measurement with PCRs 132 indicates a change in management controller 112 firmware, of failure of another authentication factor such as password or shared secret), management controller 112 may issue a notification to a user or administrator of the information handling system and/or perform one or more operations to remediate the failure, as described in greater detail below.

At step 208, key management utility 124 of management controller 112 may retrieve KEK 128 and send it to BIOS 105. At step 210, key management utility 124 of management controller 112 may clear PCRs 132 and then couple to an external network via network interface 118. Notably, key management utility 124 may be configured to refrain from coupling management controller 112 to a network until such time as KEK 128 has been retrieved, in order to prevent unauthorized retrieval through network interface 118 during boot of management controller 112.

At step 212, BIOS 105 may communicate KEK 128 to storage resource 110 in order to unlock MEK 130, after which storage resource 110 may process data using unlocked MEK 130. After completion of step 212, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As mentioned above, in some embodiments, management controller 112 may be configured to remediate a failure to unseal KEK 128. For example, in some embodiments, where a failure results from an upgrade or change to firmware of management controller 112, key management utility 124 may include a setting or option to allow a user to roll-back firmware to a previous version in order to allow for re-sealing with updated firmware. As another example, to remediate (or avoid) a failure due to a change of cryptoprocessor 126 (e.g., in anticipation of failure of cyrptoprocessor 126), key management utility 124 may include a mechanism to migrate KEK 128 from a source cryptoprocessor 126 to a target cryptoprocessor 126. As a further example, key management utility 124 may also include a mechanism for a user to enter a recovery password or other shared secret to allow for unsealing of KEK 128 in event of a failure (e.g., failure due to measurement by PCRs 132).

FIG. 3 illustrates a flow chart of an example method for provisioning KEK 128 on cryptoprocessor 126, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, BIOS 105 may be instructed to cause management controller 112 to inject KEK 128 into cryptoprocessor 126. Such instruction may come in the form of a command, keystroke, and/or other input received by information handling system 102. For example, in some embodiments, a user may invoke a BIOS setup program (e.g., by entering an appropriate keystroke during boot of information handling system 102) and enter a command during such BIOS setup program to inject KEK 128 into cryptoprocessor 126 from management controller 112.

At step 304, BIOS 105 may determine user configuration options for one or more security factors used to protect the security of KEK 128 while stored in cryptoprocessor 126. Such options may be set in response to a command, keystroke, and/or other input received by information handling system 102. For example, in some embodiments, a user may invoke a BIOS setup program (e.g., by entering an appropriate keystroke during boot of information handling system 102) and enter configuration options during such BIOS setup program. Such configuration options may allow a user to select all or a portion (or in some embodiments, none) of PCRs 132, a user password or passphrase, and/or other suitable security factors for retrieving KEK 128 from cryptoprocessor 126. Other authentication factors may include a requirement that a password or passphrase be entered during boot, a requirement that a Universal Serial Bus key be entered during boot, requirement that an information handling system grant permission to retrieve KEK 128, authentication using a handheld cryptographic device, and/or another authentication factor.

At step 306, BIOS 105 may communicate commands to key management utility 124 of management controller 112 which includes the KEK and associated configuration options. At step 308, key management utility 124 of management controller 112 may send a command to cryptoprocessor 126 which includes KEK 128, along with the associated configuration options. At step 310, in response, cryptoprocessor 126 may seal KEK 128 in accordance with the configuration options. After completion of step 310, method 300 may end.

Although FIG. 3 discloses a particular number of steps to be taken with respect to method 300, method 300 may be executed with greater or fewer steps than those depicted in FIG. 3. For example, in some embodiments, rather than issuing an instruction to BIOS 105 that causes BIOS 105 to instruct management controller 112 to inject KEK 128 into cryproprocessor 126, a user may communicate directly with management controller 112 from a management device via a web page, management console, remote command-line interface, a mobile device using near field communication or Bluetooth, or some other mechanism, in order to cause management controller 112 to inject KEK 128 into crypro-processor 126.

In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Notably, the systems and methods described above provide for a cross-domain storage of KEK 128. For example, a storage resource 110 of a host domain (e.g., of a host system comprising processor 103 and memory 104) may have its KEK 128 stored and maintained by a management domain (e.g., the management domain of management controller 112 and dedicated cryptoprocessor 126).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A management controller comprising:
   a processor; and
   a key management utility embodied in non-transitory computer-readable media;
   wherein the management controller is configured to provide management-domain, out-of-band management of an information handling system; and
   wherein the key management utility is configured to:
   issue one or more commands to a cryptoprocessor for storing and sealing a key encryption key on the cryptoprocessor, wherein the key encryption key is for decrypting a media encryption key for encrypting and decrypting data stored to a storage resource of a host domain of the information handling system, wherein the host domain is different from the management domain, and wherein the key encryption key is stored cross-domain;
   issue one or more commands to the cryptoprocessor for unsealing and retrieving the key encryption key from the cryptoprocessor; and
   remediate a failure of unsealing or retrieving the key encryption key from the cryptoprocessor by carrying out one or more of:
   rolling back a firmware version of the management controller in order to reseal the key encryption key with an updated firmware version;
   migrating the key encryption key between the cryptoprocessor and a second cryptoprocessor dedicated to the management controller; and
   receiving a recovery password for unsealing of the key encryption key.

2. The management controller of claim 1, wherein the key management utility is further configured to:
   issue the one or more commands to the cryptoprocessor for unsealing and retrieving the key encryption key from the processor while network connectivity to the management controller is disabled; and
   enable network connectivity to the management controller after the key encryption key has been retrieved from the processor.

3. The management controller of claim 1, wherein the one or more commands for storing and sealing the key encryption key on the cryptoprocessor include configuration options for sealing the key encryption key.

4. The management controller of claim 3, wherein the configuration options include multiple factors for authenticating the key encryption key.

5. The management controller of claim 4, wherein the multiple factors include:
   authenticating with one or more registers of the cryptoprocessor that are configured to measure software state, in order to measure code for booting the management controller;
   authenticating based on a user-entered password; and
   authenticating based on presence of a Universal Serial Bus key.

6. The management controller of claim 1, wherein the one or more commands for unsealing and retrieving the key encryption key are configured to cause the cryptoprocessor to:
   perform one or more operations indicative of integrity of code for booting the management controller; and
   release the key encryption key to the management controller in response to the one or more operations indicating the integrity of the code.

7. The management controller of claim 1, wherein the key management utility is further configured to communicate an indication of failure in the event of a failure of unsealing or retrieving the key encryption key from the cryptoprocessor.

8. The management controller of claim 1, wherein the key management utility is further configured to issue the one or more commands to the cryptoprocessor for storing and sealing the key encryption key on the cryptoprocessor and the one or more commands to the cryptoprocessor for unsealing and retrieving the key encryption key from the cryptoprocessor in response to at least one out-of-band management command received by the management controller from a management device communicatively coupled to the management controller.

9. A method comprising:
   issuing from a management controller configured to provide management-domain, out-of-band management of an information handling system one or more commands to a cryptoprocessor for storing and sealing a key encryption key on the cryptoprocessor, wherein the key encryption key is for decrypting a media encryption key for encrypting and decrypting data stored to a storage resource of a host domain of the information handling system, wherein the host domain is different from the management domain, and wherein the key encryption key is stored cross-domain;
   issuing one or more commands to the cryptoprocessor for unsealing and retrieving the key encryption key from the cryptoprocessor; and
   remediating a failure of unsealing or retrieving the key encryption key from the cryptoprocessor by carrying out one or more of:
      rolling back a firmware version of the management controller in order to reseal the key encryption key with an updated firmware version;
      migrating the key encryption key between the cryptoprocessor and a second cryptoprocessor dedicated to the management controller; and
      receiving a recovery password for unsealing of the key encryption key.

10. The method of claim 9, further comprising:
   issuing the one or more commands to the cryptoprocessor for unsealing and retrieving the key encryption key from the management controller while network connectivity to the management controller is disabled; and
   enabling network connectivity to the management controller after the key encryption key has been retrieved from the management controller.

11. The method of claim 9, wherein the one or more commands for storing and sealing the key encryption key on the cryptoprocessor include configuration options for sealing the key encryption key.

12. The method of claim 11, wherein the configuration options include multiple factors for authenticating the key encryption key.

13. The method of claim 12, wherein the multiple factors include:
   authenticating with one or more registers of the cryptoprocessor that measure software state, in order to measure code for booting the management controller;
   authenticating based on a user-entered password; and
   authenticating based on presence of a Universal Serial Bus key.

14. The method of claim 9, wherein the one or more commands for unsealing and retrieving the key encryption key cause the cryptoprocessor to:
   perform one or more operations indicative of integrity of code for booting the management controller; and
   release the key encryption key to the management controller in response to the one or more operations indicating the integrity of the code.

15. The method of claim 14, further comprising communicating an indication of failure in the event of a failure of unsealing or retrieving the key encryption key from the cryptoprocessor.

16. The method of claim 9, further comprising issuing the one or more commands to the cryptoprocessor for storing and sealing the key encryption key on the cryptoprocessor and the one or more commands to the cryptoprocessor for unsealing and retrieving the key encryption key from the cryptoprocessor in response to at least one out-of-band management command received by the management controller from a management device communicatively coupled to the management controller.

* * * * *